(12) United States Patent
Stoppel

(10) Patent No.: US 9,784,173 B2
(45) Date of Patent: Oct. 10, 2017

(54) LASER IGNITION DEVICE AND OPERATING METHOD THEREFOR

(71) Applicant: Robert Bosch GmbH, Stuttgart (DE)

(72) Inventor: Klaus Stoppel, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 14/395,864

(22) PCT Filed: Mar. 18, 2013

(86) PCT No.: PCT/EP2013/055540
§ 371 (c)(1),
(2) Date: Oct. 21, 2014

(87) PCT Pub. No.: WO2013/160017
PCT Pub. Date: Oct. 31, 2013

(65) Prior Publication Data
US 2015/0136049 A1    May 21, 2015

(30) Foreign Application Priority Data

Apr. 23, 2012  (DE) .................. 10 2012 206 643

(51) Int. Cl.
| | |
|---|---|
| *F01P 1/10* | (2006.01) |
| *F01P 3/16* | (2006.01) |
| *F02P 23/04* | (2006.01) |
| *F02F 1/36* | (2006.01) |
| *F02B 1/04* | (2006.01) |
| *F02F 1/24* | (2006.01) |

(Continued)

(52) U.S. Cl.
CPC .............. *F01P 3/16* (2013.01); *F02P 23/04* (2013.01); *F02B 1/04* (2013.01); *F02F 1/242* (2013.01); *F02F 1/365* (2013.01); *F02F 1/4214* (2013.01); *F02F 2001/247* (2013.01); *H01S 3/0407* (2013.01)

(58) Field of Classification Search
CPC ..... F02B 1/04; F02F 2001/247; F02F 1/4214; F02F 1/365; F02F 1/242; F01P 3/16
USPC ...................................... 123/41.32
See application file for complete search history.

(56) References Cited

U.S. PATENT DOCUMENTS

2007/0064746 A1* 3/2007 Winklhofer ............. F02P 23/04
372/10

FOREIGN PATENT DOCUMENTS

| DE | 10 2010 031598 | 1/2012 |
|---|---|---|
| WO | 2005/028856 | 3/2005 |

(Continued)

*Primary Examiner* — Jacob Amick
*Assistant Examiner* — Charles Brauch
(74) *Attorney, Agent, or Firm* — Norton Rose Fulbright US LLP; Gerard Messina

(57) ABSTRACT

A laser ignition device for an internal combustion engine, in which the laser ignition device has at least one laser spark plug and a cooling device for temperature control, in particular cooling, of the laser spark plug. The cooling device has a cooling circuit, containing a coolant, which is thermally connectable to at least one component of the laser spark plug, a volume of the coolant contained in the cooling circuit being less than or equal to approximately 50% of a compression volume of a cylinder of the internal combustion engine, which may be less than or equal to approximately 10% of a compression volume of the cylinder of the internal combustion engine.

21 Claims, 2 Drawing Sheets

(51) Int. Cl.
  *F02F 1/42*  (2006.01)
  *H01S 3/04*  (2006.01)

(56) References Cited

FOREIGN PATENT DOCUMENTS

WO  2011/041805  4/2011
WO  2013/010704  1/2013

* cited by examiner

LASER IGNITION DEVICE AND OPERATING METHOD THEREFOR

FIELD OF THE INVENTION

The present invention relates to a laser ignition device for an internal combustion engine, the laser ignition device having at least one laser spark plug and a cooling device for temperature control, in particular cooling, of the laser spark plug.

BACKGROUND INFORMATION

Cooling systems of laser ignition devices, which are based on liquid cooling, have the disadvantage that coolant flowing out of a cooling circuit of the cooling system, in particular water (leakage water), may flow into the cylinder shaft of the internal combustion engine and may even enter the combustion chamber during a change of the laser spark plug. The compression ratio is thus increased during operation of the internal combustion engine, since the coolant, in particular water, is understood to be incompressible, so that the internal combustion engine may be destroyed as a result of the leakage water (water hammer). The causes of the leakage water are generally leaky cooling water connections or installation errors.

SUMMARY OF THE INVENTION

It is accordingly the object of the present invention to improve a laser ignition device of the type mentioned at the outset in such a way that the risk of a water hammer is reduced or completely prevented.

This object may be achieved in the case of the laser ignition device of the type mentioned at the outset in that the cooling device has a cooling circuit containing a coolant, which is thermally connectable to at least one component of the laser spark plug, a volume of the coolant contained in the cooling circuit being less than or equal to approximately 50% of a compression volume of a cylinder of the internal combustion engine, which may be less than or equal to approximately 10% of a compression volume of the cylinder of the internal combustion engine.

The compression volume of a cylinder of the internal combustion engine corresponds to the minimal combustion chamber volume which may result during the working cycle of the cylinder. The compression volume is reached when the piston of the observed cylinder is located at top dead center.

Due to the measure according to the present invention of keeping the volume of the coolant contained in the cooling circuit less than or equal to a predefined fraction of the compression volume of the cylinder, an impermissibly high combustion chamber pressure advantageously does not occur in the cylinder, even if the coolant has unintentionally partially or entirely entered the combustion chamber.

The principle according to the present invention accordingly provides limiting of the liquid amount of the coolant, which is advantageously related to the compression volume of the cylinder of the internal combustion engine, to achieve limiting of the overpressure occurring as a result of water entry into the combustion chamber. Alternatively, the principle of limiting the liquid amount of the coolant may also provide the provision of an absolute maximum amount of coolant.

The maximum amount of coolant contained in the cooling circuit of the laser ignition device or the volume thereof is particularly advantageously established in relation to the compression volume of a cylinder, with which a laser spark plug of the laser ignition device according to the present invention is to be associated.

A laser ignition device according to the description herein is specified as a further achievement of the object of the present invention. In this variant of the present invention, a volume of the coolant contained in the cooling circuit is less than or equal to approximately 0.1 L, which may be less than or equal to 0.05 L, whereby typical usage cases of the laser ignition device according to the present invention, namely the use in stationary large-bore gas engines, are covered. Such large-bore gas engines generally have cylinder volumes between approximately 2 L and approximately 4 L. The limiting according to the present invention of the volume of the coolant to approximately 0.1 L or less than approximately 0.05 L is particularly advantageous, since in the event of an unintentional escape of the coolant from the cooling circuit of the laser ignition device according to the present invention into a cylinder of the large-bore gas engine, an impermissibly high compression pressure at top dead center of the cylinder is not a concern.

For internal combustion engines having smaller cylinder volumes, for example, internal combustion engines of motor vehicles and the like, a correspondingly smaller amount of coolant is to be provided in the cooling circuit. For example, for typical internal combustion engines of motor vehicles, the amount of the coolant may be limited to values less than approximately 0.05 L, for example, values less than approximately 0.02 L or even less than 0.01 L.

In one advantageous specific embodiment of the present invention, it is provided that the cooling circuit has a first heat exchanger, which is thermally connectable to at least one component of the laser spark plug, the cooling circuit having a second heat exchanger, which is thermally connectable to a heat sink, and a conveyance arrangement being provided to cause a circulation of the coolant in the cooling circuit. The spatial content of the conveyance arrangement to which coolant may be applied is advantageously also incorporated in the dimensioning according to the present invention of the maximum volume of the coolant.

The first heat exchanger may advantageously be connected directly to a housing of the laser spark plug to be cooled or to a component of the laser spark plug. A direct thermal connection of the first heat exchanger to a heat source of the laser spark plug is particularly advantageous, for example, to a semiconductor laser or the like. The second heat exchanger is advantageously situated remotely from the laser spark plug and is connectable or connected to a heat sink. For example, the following components may be used as a heat sink:

1. A metal housing of an intake manifold of the internal combustion engine. The temperature of the heat sink corresponds in this case to the temperature of the intake air, which is typically between approximately 20° C. and approximately 35° C.

2. A heat conduction arrangement associated with multiple cylinders, for example, a metal pipe or stainless steel corrugated hose or the like, which is in turn cooled with the aid of coolants, for example, has cooling water flowing through it of a charge air cooler or mixture cooler associated with the internal combustion engine. In this case, the maximum temperature of the heat sink is approximately 45° C. in typical applications.

3. A housing of the internal combustion engine itself may also be used as a heat sink, the maximum temperature approximately corresponding to the cooling water temperature of the engine cooling of the internal combustion engine, i.e., approximately at most 85° C.

4. A pipe through which air flows, to which ambient air is applied, so that approximately the ambient air temperature between 20° C. and 35° C. again results as the temperature of the heat sink. Surface-enlarging measures may optionally be taken in the pipe through which air flows, for example, the integration of cooling ribs in the air-conducting cross section of the pipe.

5. A further alternative for the configuration of a heat sink for use with the laser ignition device according to the present invention is a metal pipe or a stainless steel corrugated hose, cooling water of a primary cooler, which is provided for the laser ignition device on the internal combustion engine, flowing through these elements. This primary cooler may be, for example, a so-called chiller (having constant temperature selection) or an air-water cooler (temperature is dependent on the ambient temperature). This configuration of the heat sink is somewhat more complex and costly than the preceding four variants.

Other embodiments of the heat sink and combinations of preceding measures 1 through 5 are also conceivable. To achieve an improved temperature gradient between the cooling circuit and the heat source or the heat sink, one or multiple Peltier elements may optionally be provided in series, the Peltier element or elements being situated either in the laser spark plug between the heat source (semiconductor laser) and the first heat exchanger of the cooling circuit or also outside the laser spark plug. For example, the Peltier element or elements may also be situated between the second heat exchanger and the heat sink or at another point of the cooling circuit. Peltier elements may in general be connected by the following connection techniques to the components of the laser ignition device according to the present invention or its cooling circuit: by clamping in the case of application on both sides of a heat conducting paste and/or a heat conducting adhesive and/or a heat conducting film or by soldering in the case of surfaces which are metal-plated on both sides of the Peltier element.

It is also possible to apply a heat conducting paste to one surface of the Peltier element and to solder another surface of the Peltier element, which is metal-plated. Combinations of the above-mentioned connection techniques are also conceivable.

To be able to set the temperature difference provided by the Peltier element exactly, a controller or a regulator is necessary. The regulator operates with a temperature sensor, for example, which may be fastened close to a cold side of the Peltier element.

In another advantageous specific embodiment, it is provided that the cooling circuit has at least one fluid line for guiding the coolant, the fluid line may be configured to be flexible. The provision of one or multiple fluid lines advantageously enables a spatially separated arrangement of the first and second heat exchangers in such a way that the waste heat of the laser spark plug to be cooled may be transported to a remotely situated heat sink. The cooling circuit particularly advantageously has a first fluid line, which leads from the heat sink or the second heat exchanger to the first heat exchanger, i.e., the "hot" end of the cooling circuit, and a second fluid line, which guides the coolant heated in the area of the first heat exchanger back to the heat sink. A circulation of the coolant in the cooling circuit is implemented by providing a conveyance arrangement, in particular a pump, particularly a miniaturized pump driven by an electric motor. In one particularly specific embodiment, this pump has a maximum electric power consumption of approximately 8 W. Other conveyance arrangement (diaphragm pump, etc.) are also conceivable.

In another advantageous specific embodiment, it is provided that at least one fluid line has an internal diameter of at most approximately 4 mm (millimeters), which may be at most approximately 3 mm, whereby, on the one hand, a measure is implemented which limits the total volume of the coolant in the cooling circuit, and whereby, on the other hand, a speed is advantageously limited, at which the coolant runs out of the cooling circuit in case of a leak, for example, into the cylinder shaft of the internal combustion engine.

It is also conceivable to provide fluid lines for the cooling circuit according to the present invention, which have a maximum internal diameter of less than 3 mm.

In another advantageous specific embodiment, it is provided that an aggregate total length of all fluid lines of the cooling circuit is at most approximately 4 m, which may be approximately 2 m, whereby flow-dynamic effects which impair the circulation of the coolant are limited. In addition, a limitation of the total volume of the coolant is also made possible by the selection or limiting of the aggregate total length of all fluid lines of the cooling circuit.

In another advantageous specific embodiment, it is provided that the cooling circuit has a flow rate of coolant per unit of time of at least approximately 2 mL/min (milliliters per minute), which may be at least approximately 50 mL/min. The fluid may circulate one time per minute in the cooling circuit.

In another advantageous specific embodiment, it is provided that at least one fluid line for guiding the coolant and/or conveyance arrangement for the coolant are at least partially integrated into a wiring harness of the laser spark plug. The wiring harness contains activation lines which are typically required for operating the laser spark plug, and which may be configured to be electrical and/or optical. Due to the integration of the fluid line and/or the conveyance arrangement for the coolant into the wiring harness, a particularly simple installation of the laser ignition device according to the present invention is made possible. At the same time, the fluid lines of the laser ignition device according to the present invention may be protected by the same mechanical arrangement for protecting the wiring harness as are provided in any case for the electrical or optical lines of the laser spark plug. In addition, the coolant in the fluid lines enables a cooling function of the wiring harness.

In another embodiment of the laser ignition device, at least one fluid line for guiding the coolant and/or conveyance arrangement for the coolant are at least partially thermally insulated in relation to the surroundings. For example, a heat protection insulation is situated on surfaces of the fluid lines, whereby undesirable heating of the coolant as a result of incident radiation of heat emitted by the internal combustion engine is prevented.

According to another specific embodiment, the cooling circuit is particularly configured to be closed. This means that no fluid connections are provided between the components of the cooling circuit (fluid line(s), conveyance arrangement, heat exchanger), which are to be opened or closed for the installation or removal, respectively, of the laser ignition device. Rather, the assembly of the laser ignition device according to the present invention may advantageously take place in a manufacturing shop, so that opening of the fluid circuit of the cooling device according to the present invention is not necessary on-site, i.e., in the area of the internal combustion engine. The risk of leaking is thus further reduced.

An internal combustion engine according to Patent claim 11 and operating methods according to Patent claims 12 and 13 are provided as further achievements of the object of the present invention.

Further features and specific embodiments of the present invention are furthermore found in the following drawings and the associated description, the features being able to be important for the present invention both alone and also in various combinations, without this being explicitly noted once again.

Exemplary specific embodiments of the present invention are explained hereafter with reference to the drawings.

DETAILED DESCRIPTION

Figure 1:
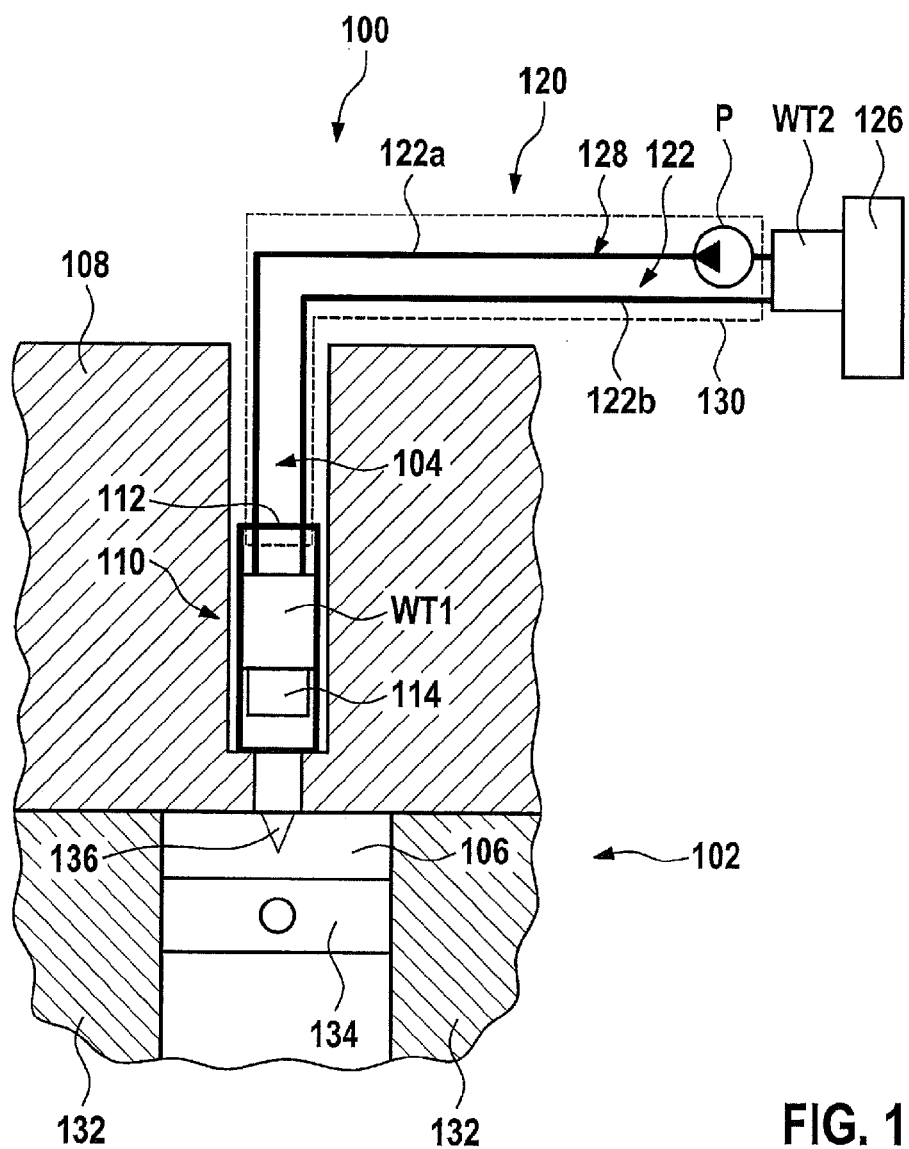
FIG. 1 shows a simplified sectional view of housing sections situated on a combustion chamber of an internal combustion engine and a laser ignition device in a first specific embodiment.

Identical reference numerals are used for functionally equivalent elements and dimensions in all figures, also in different specific embodiments.

FIG. 1 shows a first specific embodiment of a laser ignition device 100 according to the present invention for an internal combustion engine 102 in the mounting position in the area of a cylinder head 108 of internal combustion engine 102. Laser ignition device 100 has a laser spark plug 110, which is situated in a way known per se in a cylinder shaft 104 of internal combustion engine 102. Furthermore, laser ignition device 100 includes a cooling device 120 for the temperature control, in particular cooling, of laser spark plug 110. For this purpose, cooling device 120 has a cooling circuit 122, which contains a coolant 128. Cooling circuit 122 is thermally connectable or connected to at least one component of laser spark plug 110.

Laser spark plug 110 includes in the present case, inter alia, a housing 112, in which a semiconductor laser 114 and a first heat exchanger WT1 of cooling circuit 122 are situated. Heat exchanger WT1 and semiconductor laser 114 are situated adjacent and are thermally coupled in the present case. Furthermore, cooling circuit 122 has a second heat exchanger WT2, which is thermally coupled to a heat sink 126, in a top right area of the drawing.

A cylinder 132, which has a combustion chamber 106 and a piston 134 of cylinder 132, is situated below cylinder head 108 in the drawing.

It is provided according to the present invention that a volume of coolant 128 contained in cooling circuit 122 is less than or equal to approximately 50% of a compression volume of cylinder 132 of internal combustion engine 102, which may be less than or equal to approximately 10% of the compression volume of cylinder 132 of internal combustion engine 102. Due to this measure, keeping the volume of coolant 128 contained in cooling circuit 122 to less than or equal to a predefined fraction of the compression volume of cylinder 132, an impermissibly high combustion chamber pressure advantageously does not occur in cylinder 132, even if coolant 128 has unintentionally partially or entirely entered combustion chamber 106. In this way, even in the most unfavorable conceivable case, specifically if coolant 128 flows completely into combustion chamber 106 as a result of a leak or an error during the maintenance of laser ignition device 100, damage to internal combustion engine 102 (for example, by water hammer) may be essentially prevented.

The principle according to the present invention accordingly provides limiting of the amount of liquid of coolant 128, which is advantageously related to the compression volume of cylinder 132 of internal combustion engine 102, to achieve limiting of the overpressure occurring as a result of water entering combustion chamber 106.

In one alternative variant of the present invention, a volume of coolant 128 contained in cooling circuit 122 is limited to less than or equal to approximately 0.1 L, which may be to less than or equal to 0.05 L. Typical applications of laser ignition device 100 according to the present invention, namely the use in stationary large-bore gas engines, may thus be covered. Such large-bore gas engines typically have cylinder volumes between approximately 2 L and approximately 4 L. The limiting of the volume of coolant 128 to approximately 0.1 L or less than approximately 0.05 L is particularly advantageous, since in the event of an unintentional escape of coolant 128 from cooling circuit 122 of laser ignition device 100 into a cylinder 132 of the large-bore gas engine, an impermissibly high compression pressure at top dead center of cylinder 132 is hardly a concern.

To cause circulation of the coolant 128 in cooling circuit 122 and therefore a transport of heat from first heat exchanger WT1 to second heat exchanger WT2, which may be situated remotely, cooling circuit 122 additionally includes a pump P ("conveyance arrangement"). A first and a second fluid line 122a and 122b of cooling circuit 122 are connected to an end section of laser spark plug 110 facing away from the combustion chamber or to heat exchanger WT1, respectively. Fluid lines 122a and 122b may be configured to be flexible and lead upward out of cylinder shaft 104 in FIG. 1.

In the present case, heat sink 126 is a metal housing of an air supply (intake manifold) of internal combustion engine 102. The ambient air required for operating internal combustion engine 102 flows through the intake manifold and therefore it generally has a temperature of approximately +20° C. to +35° C.

In one alternative specific embodiment (not shown in FIG. 1) of laser ignition device 100, heat sink 126 is a continuous metal pipe or a stainless steel corrugated hose situated on a cylinder bank of internal combustion engine 102. The cooling water of a charge air cooler or mixture cooler, which generally has a temperature of less than +45° C., flows through this element.

In another alternative specific embodiment of laser ignition device 100, heat sink 126 is a housing of internal combustion engine 102, which generally has a temperature of at most +85° C. as a result of the engine cooling. In still another specific embodiment, heat sink 126 is a pipe through which the ambient air flows (approximately +20° C. to +35° C.), the pipe may have integrated cooling ribs.

In still another specific embodiment, heat sink 126 is a metal pipe or a stainless steel corrugated hose, through which cooling water from a primary cooler flows. This primary cooler is specifically configured for cooling laser ignition device 100 and is, for example, a so-called "chiller" having a constant temperature setpoint value. Alternatively, the primary cooler may also be an air-water cooler, the temperature being dependent on the ambient temperature.

This last-mentioned specific embodiment of heat sink 126 may be comparatively costly and also cause comparatively high operating costs.

According to one particularly specific embodiment, cooling device 120 forms a closed cooling circuit 122 together with fluid lines 122a and 122b. This means that no fluid connections are provided between the components of cooling circuit 122 (fluid line(s) 122a and 122b, pump P, heat exchangers WT1 and WT2), which are to be opened or closed for the installation or removal, respectively, of laser ignition device 100.

Fluid lines 122a and 122b are filled with coolant 128 and, in one specific embodiment, are integrated together with pump P ("mini pump") in a wiring harness 130 ("connection strand" of laser spark plug 110). Wiring harness 130 is shown in the drawing by a dashed frame. Fluid lines 122a and 122b have in the present case an internal diameter of at most approximately 4 mm (millimeters) and a total length of at most approximately 2 m (meters). A volume of coolant 128 in fluid lines 122a and 122b, in pump P, and in heat exchangers WT1 and WT2 is thus in the present case in total only approximately 0.05 L (50 mL, milliliters). In one embodiment of laser ignition device 100, thermal protection insulation is situated on the surfaces of fluid lines 122a and 122b, whereby incident radiation of heat emitted by internal combustion engine 102 is prevented. A compensation container may be integrated on the pump or close to the pump, which compensates for pressure and volume variations of the coolant.

During operation of internal combustion engine 102 or laser ignition device 100, a plasma 136 is periodically generated with the aid of laser spark plug 110, whereby a gas-air mixture, which is present in combustion chamber 106 and is compressed with the aid of piston 134, is ignited. Pump P conveys coolant 128, which may be continuously, at a flow rate of approximately 5 mL/min (milliliters per minute) in the present case, through the cooling circuit 122. The heat which is generated in semiconductor laser 114 and transferred to heat exchanger WT1 is conveyed with the aid of coolant 128 circulating in cooling circuit 122 to heat exchanger WT2. Heat exchanger WT2 transfers the heat to heat sink 126. In this way, an operating temperature of semiconductor laser 114 or laser spark plug 110 may be kept within permissible limits. If needed, the flow rate in cooling circuit 122 may be increased with the aid of appropriate dimensioning of pump P and raised to 2000 mL/min, for example.

Figure 2:
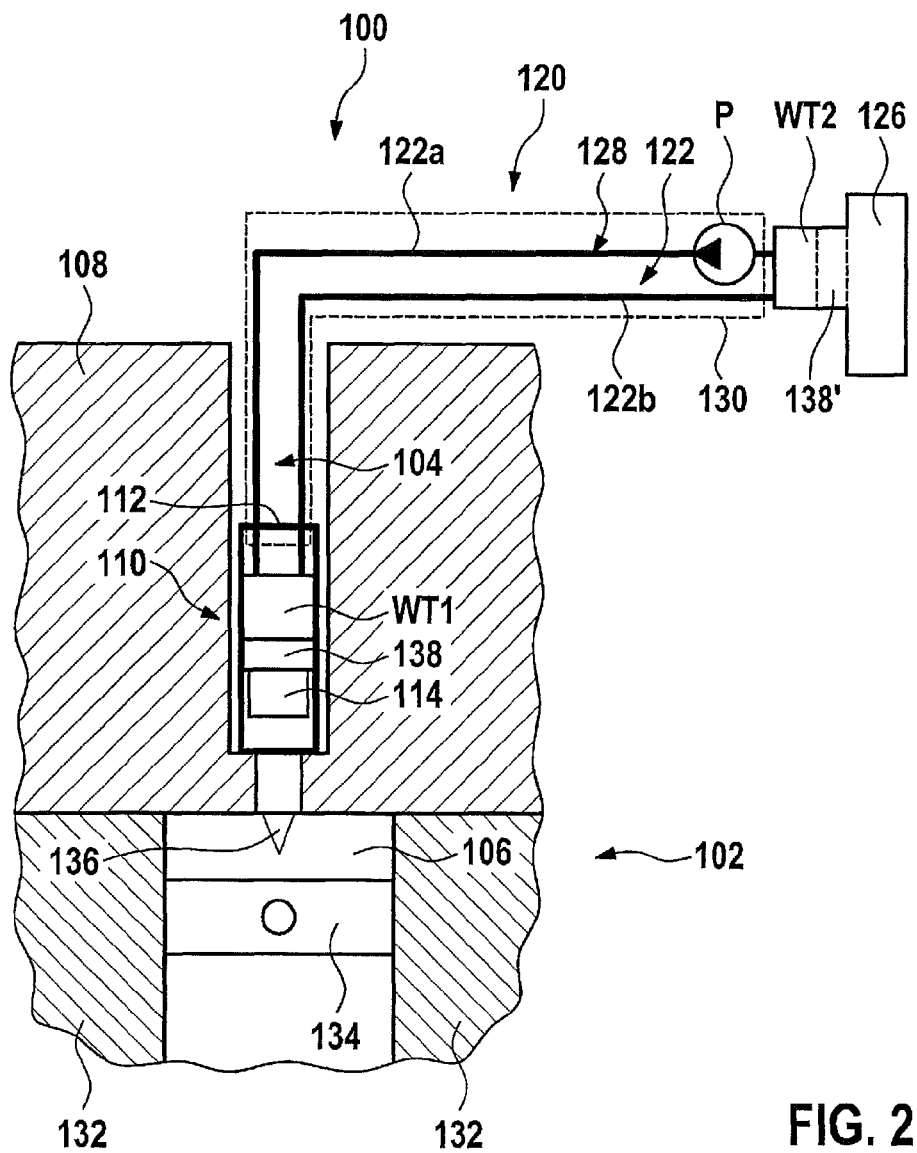
FIG. 2 shows an alternative system to FIG. 1 having a second specific embodiment of the laser ignition device.

FIG. 2 shows one alternative specific embodiment of laser ignition device 100. In contrast to FIG. 1, laser ignition device 100 of FIG. 2 additionally includes a Peltier element 138, which is situated between semiconductor laser 114 and heat exchanger WT1. Alternatively or additionally, a Peltier element 138' may be situated between heat exchanger WT2 and heat sink 126. Peltier element 138' is shown by dashed lines in the drawing.

Peltier element 138 or 138' may be situated in a first embodiment by clamping and with the use of a heat conducting paste, a heat conducting adhesive, or a heat conducting film between semiconductor laser 114 and heat exchanger WT1 or between heat exchanger WT2 and heat sink 126. In a second embodiment, Peltier element 138 or 138' may have a surface which is metal-plated on both sides and therefore may be situated between the particular connection partners with the aid of soldering. Peltier element 138 or 138' may be regulated during operation (Peltier regulation). For this purpose, the cold side of Peltier element 138 or 138' is thermally coupled to a temperature sensor.

Due to the use of Peltier element 138 or 138', the heat transport from laser spark plug 110 to heat sink 126 is improved and therefore the efficiency of cooling device 120 as a whole is increased.

In another specific embodiment, cooling device 120 is configured in such a way that a flow rate of coolant 128 of less than or equal to approximately 2000 mL/min, which may be less than or equal to approximately 50 mL/min, is sufficient to cool the laser spark plug sufficiently well during operation.

In addition to preventing a water hammer due to the special configuration of the system according to the present invention, the installation on the internal combustion engine is very simple, because components 120, 122a, 122b, P are advantageously integratable into wiring harness 130. A laser ignition device 100 according to the present invention may be associated with each cylinder of internal combustion engine 102. It is advantageously ensured by the provision of a "cylinder-individual" cooling circuit, i.e., in each case one cooling circuit 122 per cylinder, having a separate conveyance arrangement P, that the further cylinders or the laser spark plugs thereof remain operationally ready even in the event of failure of cooling circuit 122 at one cylinder.

What is claimed is:

1. A laser ignition device for an internal combustion engine, comprising:
   at least one laser spark plug; and
   a cooling device for temperature control for cooling of the laser spark plug;
   wherein the cooling device has a cooling circuit, containing a coolant, which is thermally connectable to at least one component of the laser spark plug, and wherein a volume of the coolant contained in the cooling circuit is less than or equal to approximately 50% of a compression volume of a cylinder of the internal combustion engine.

2. A laser ignition device for an internal combustion engine of a motor vehicle, comprising:
   at least one laser spark plug; and
   a cooling device for temperature control for cooling of the laser spark plug;
   wherein the cooling device has a cooling circuit containing a coolant, which is thermally connectable to at least one component of the laser spark plug, and wherein a volume of the coolant contained in the cooling circuit is less than or equal to approximately 0.1 L.

3. The laser ignition device of claim 1, wherein the cooling circuit has a first heat exchanger, which is thermally connectable to at least one component of the laser spark plug, the cooling circuit having a second heat exchanger which is thermally connectable to a heat sink, and having a conveyance arrangement to cause a circulation of the coolant in the cooling circuit.

4. The laser ignition device of claim 1, wherein the cooling circuit has at least one fluid line for guiding the coolant.

5. The laser ignition device of claim 4, wherein at least one fluid line has an internal diameter of at most approximately 4 mm.

6. The laser ignition device of claim 4, wherein an aggregate total length of all fluid lines of the cooling circuit is at most approximately 4 m.

7. The laser ignition device of claim 1, wherein the cooling circuit has a flow rate of coolant per unit of time of at least approximately 2 mL per minute.

8. The laser ignition device of claim 1, wherein at least one of at least one fluid line for guiding the coolant and a conveyance arrangement for the coolant are at least partially integrated into a wiring harness of the laser spark plug.

9. The laser ignition device of claim 1, wherein at least one of at least one fluid line for guiding the coolant and a conveyance arrangement for the coolant are at least partially thermally insulated in relation to the surroundings.

10. The laser ignition device of claim 1, wherein the cooling circuit is configured to be closed.

11. An internal combustion engine, comprising:
at least one laser ignition device, including:
at least one laser spark plug; and
a cooling device for temperature control for cooling of the laser spark plug;
wherein the cooling device has a cooling circuit, containing a coolant, which is thermally connectable to at least one component of the laser spark plug, and wherein a volume of the coolant contained in the cooling circuit is less than or equal to approximately 50% of a compression volume of a cylinder of the internal combustion engine.

12. A method for operating a laser ignition device for an internal combustion engine, comprising:
using at least one laser ignition device, which includes at least one laser spark plug, and a cooling device for temperature control for cooling of the laser spark plug;
operating the cooling device, which has a cooling circuit, containing a coolant, which is thermally connectable to at least one component of the laser spark plug, and wherein a volume of the coolant contained in the cooling circuit is less than or equal to approximately 50% of a compression volume of a cylinder of the internal combustion engine.

13. A method for operating a laser ignition device for an internal combustion engine of a motor vehicle, the method comprising:
using at least one laser ignition device, which includes at least one laser spark plug and a cooling device for temperature control for cooling of the laser spark plug; and
operating the cooling device, which has a cooling circuit containing a coolant, which is thermally connectable to at least one component of the laser spark plug, and wherein a volume of the coolant contained in the cooling circuit is less than or equal to approximately 0.1 L.

14. The laser ignition device of claim 1, wherein the volume of the coolant contained in the cooling circuit is less than or equal to approximately 10% of a compression volume of a cylinder of the internal combustion engine.

15. The laser ignition device of claim 2, wherein the volume of the coolant contained in the cooling circuit is less than or equal to approximately 0.05 L.

16. The laser ignition device of claim 1, wherein the cooling circuit has at least one fluid line for guiding the coolant, the fluid line being configured to be flexible.

17. The laser ignition device of claim 16, wherein at least one fluid line has an internal diameter of at most approximately 3 mm.

18. The laser ignition device of claim 4, wherein an aggregate total length of all fluid lines of the cooling circuit is at most approximately 2 m.

19. The laser ignition device of claim 1, wherein the cooling circuit has a flow rate of coolant per unit of time of at least approximately 50 mL per minute.

20. The method of claim 12, wherein the volume of the coolant contained in the cooling circuit is less than or equal to approximately 10% of a compression volume of a cylinder of the internal combustion engine.

21. The method of claim 13, wherein the volume of the coolant contained in the cooling circuit is less than or equal to approximately 0.05 L.

\* \* \* \* \*